US00RE38748E

(19) United States
(12) Reissued Patent
Ritter et al.

(10) Patent Number: US RE38,748 E
(45) Date of Reissued Patent: Jun. 28, 2005

(54) TRANSPORTABLE NOTE PAD HOLDER

(76) Inventors: David Ritter, 10 S. Wacker Dr.-Suite 4000, Chicago, IL (US) 60606; Mitchell Feldman, 2251 Congressional La., Riverwoods, IL (US) 60015

(21) Appl. No.: 10/307,799

(22) Filed: Dec. 2, 2002

Related U.S. Patent Documents

Reissue of:
(64) Patent No.: 6,361,075
Issued: Mar. 26, 2002
Appl. No.: 09/586,696
Filed: Jun. 1, 2000

(51) Int. Cl.[7] ..... B24D 17/00
(52) U.S. Cl. ..... 281/44; 224/277; 281/45; 462/72; D19/22; D19/78; D19/91
(58) Field of Search ..... 281/44, 45; 224/277; 462/71, 72; D19/22, 23, 78, 79, 91, 92

(56) References Cited

U.S. PATENT DOCUMENTS

| | | | | | |
|---|---|---|---|---|---|
| D157,150 | S | * | 2/1950 | Hanson | |
| 2,806,715 | A | * | 9/1957 | Smith | 281/44 |
| 2,883,792 | A | * | 4/1959 | Marano | |
| D256,258 | S | * | 8/1980 | Varrin | |
| 4,418,333 | A | * | 11/1983 | Schwarzbach et al. | 340/310.01 |
| D284,677 | S | * | 7/1986 | Armijo | |
| D298,953 | S | * | 12/1988 | Roberts | D19/78 |
| D324,076 | S | * | 2/1992 | Freitag | D19/78 |
| 5,100,178 | A | * | 3/1992 | MacKelvie | |
| 5,143,250 | A | * | 9/1992 | Freitag | 221/59 |
| 5,174,607 | A | * | 12/1992 | Hill | 281/45 |
| 5,183,153 | A | * | 2/1993 | Linn | 206/232 |
| 5,273,155 | A | * | 12/1993 | Sala | 281/44 |
| D349,170 | S | * | 7/1994 | Lin | D26/51 |
| D357,938 | S | * | 5/1995 | Wolff | |
| D357,941 | S | * | 5/1995 | Davis | |
| 5,432,687 | A | * | 7/1995 | Lane | 362/99 |
| 5,639,123 | A | * | 6/1997 | Medley et al. | 281/44 |
| 5,673,942 | A | * | 10/1997 | Despointes | 281/44 |
| D387,806 | S | * | 12/1997 | Carlson et al. | D19/86 |
| 5,765,721 | A | | 6/1998 | Vance | |
| D396,492 | S | * | 7/1998 | Carlson et al. | D19/86 |
| 5,964,375 | A | | 10/1999 | Carlson et al. | |
| D436,377 | S | * | 1/2001 | Young et al. | D19/78 |

FOREIGN PATENT DOCUMENTS

| | | |
|---|---|---|
| FR | 92 15964 | 12/1992 |
| WO | WO 97/00778 | 1/1997 |

* cited by examiner

*Primary Examiner*—Andrea Wellington
(74) *Attorney, Agent, or Firm*—Neal, Gerber & Eisenberg LLP

(57) ABSTRACT

A transportable note pad holder that includes a main body having a note pad well for carrying a note pad. The main body is adapted to be removably carried within a sheath. The sheath includes a means for attachment to an article, illustrated as a pair of resilient arm clips that may be used to attach the sheath to a back pack strap or the like. To remind the user that a note carried within the main body is to be reviewed, the main body is provided with an alarm. Preferably, the alarm is connected to a lamp that will draw the attention of the user to the note pad holder. The lamp may also be arranged to illuminate the interior of the main body in order to allow a user to read any notes carried thereby.

28 Claims, 4 Drawing Sheets

TRANSPORTABLE NOTE PAD HOLDER

Matter enclosed in heavy brackets [ ] appears in the original patent but forms no part of this reissue specification; matter printed in italics indicates the additions made by reissue.

BACKGROUND OF THE INVENTION

This invention relates generally to note pad holders and, more particularly, relates to a transportable holder for non-permanently bound, self sticking note pad sheets such as those found in 3M Corporation's "POST-IT" brand note pads.

In the prior art, note pad holders are known. For example, U.S. Pat. No. 5,639,123, issued Jun. 17, 1997, discloses a cushioned note pad holder with an illuminating device. The integrated features of the note pad holder include a padded outer frame and a center webbing for supporting a note pad of the removable, self-stick variety. The not pad is held in place by ridges molded into the padded frame that protrude from the inner surfaces of the frame. The ridges allow the note pad to be securely maintained within the holder while providing access to the top surface of the note pad. The note pad holder also includes a notch for use in securing an illuminated writing device. The illuminated writing device allows a user to use the note pad while in the dark.

A further note pad holder is disclosed in U.S. Pat. No. 5,100,178, issued Mar. 31, 1992, which includes a frame fitted with compressible elements that function to provide a side holding force to releasably retain a note pad of the removable, self-stick variety. The frame is provided with a frame mounting nut for use in attaching a variety of mounting hardware such as a spring clip or suction cup. To cover the mounting nut, a header piece is used that may carry advertising, a calculator, or a timepiece. In addition, the frame may include a hinged cover thereby providing a book-like format as well as a place on the inside of the cover to store written notes while exposing a new note surface.

While these note pad holders work for their intended purpose, a need exists for a note pad holder that is more convenient to transport. Furthermore, a need exists for a transportable note pad holder that is more esthetically pleasing, in particular, to children. Still further, a need exists for a transportable note pad holder having a means by which a user can be reminded to review its contents.

SUMMARY OF THE INVENTION

In accordance with these needs, a note pad holder is provided that is especially adapted to be easily transported and useful as a means for reminding children to perform tasks, errands, etc. To this end, the note pad holder generally comprises a main body having a note pad well that is sized for carrying a note pad, preferably of the removable, fl self-stick variety. The main body is adapted to be removably carried within a sheath. The sheath includes a means for attachment to a bag strap. In particular, the sheath is provided with a pair of resilient arm clips that may be used to attach the sheath to a back pack strap or the like. In this manner, the sheath may be left attached to the back pack and the main body may be removed and inserted as desired.

To remind the user that a note carried within the main body is to be reviewed, the main body is also provided with an alarm. Preferably, the alarm is connected to a lamp that will draw the attention of the user to the note pad holder. The lamp may also be arranged to illuminate the interior of the main body in order to allow a user to read any notes carried thereby.

A better understanding of the objects, advantages, features, properties and relationships of the invention will be obtained from the following detailed description and accompanying drawings which set forth an illustrative embodiment and which are indicative of the various ways in which the principles of the invention may be employed.

BRIEF DESCRIPTION OF THE DRAWINGS

For a better understanding of the invention, reference may be had to a preferred embodiment shown in the following drawings in which.

DETAILED DESCRIPTION

Figure 1:
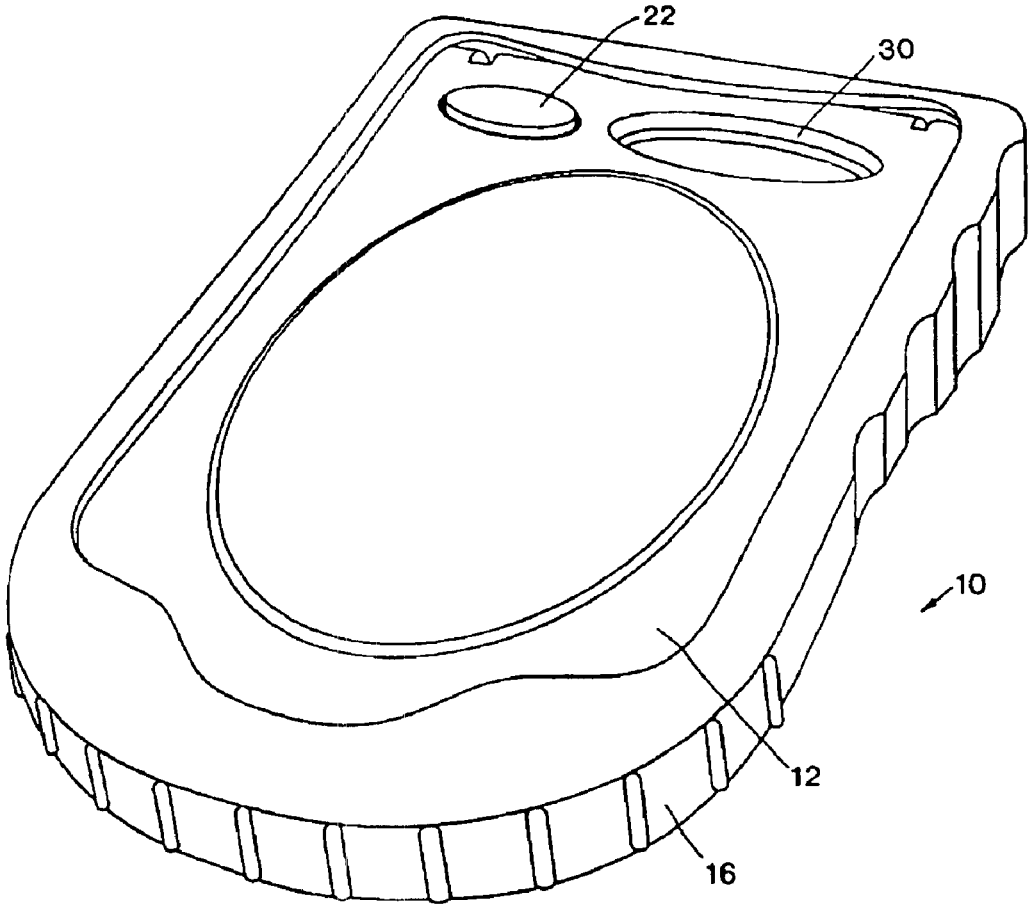
FIG. 1 is a perspective view of transportable note pad holder constructed in accordance with the present invention.
Figure 2:
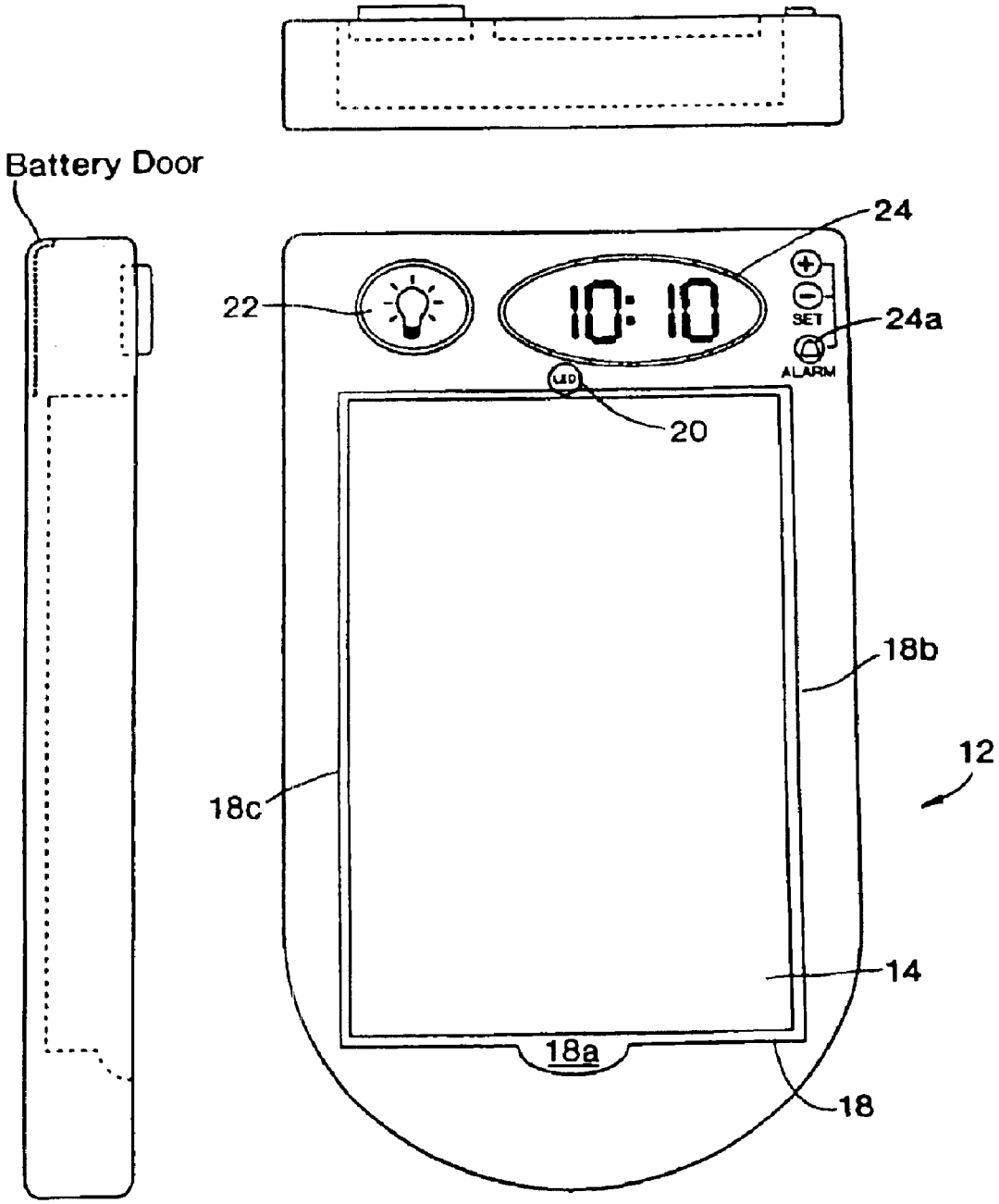
FIG. 2 is a top plan view of the main body of FIG. 1.
Figure 3:
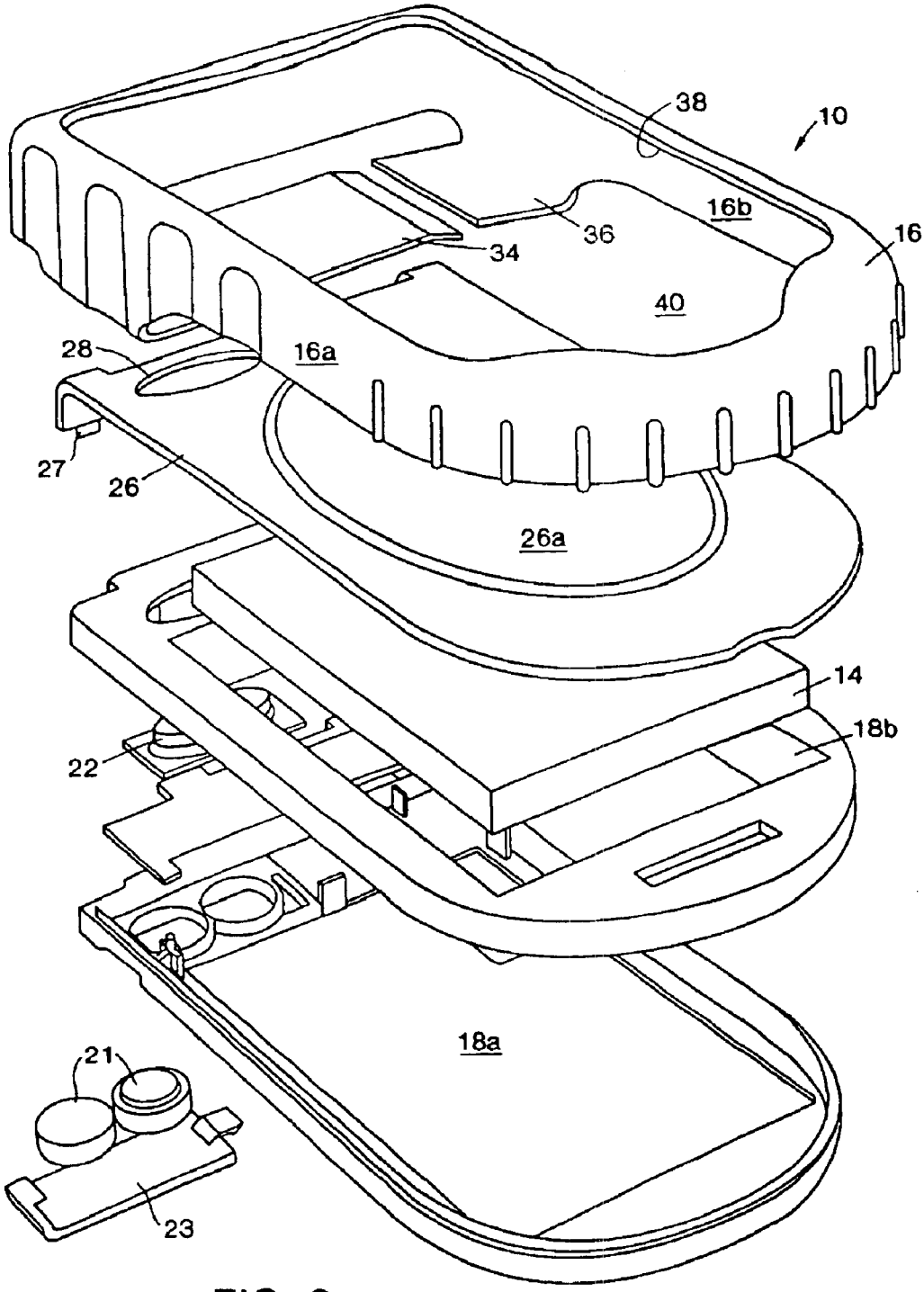
FIG. 3 is an exploded perspective view of the note pad holder FIG. 1.
Figure 4:
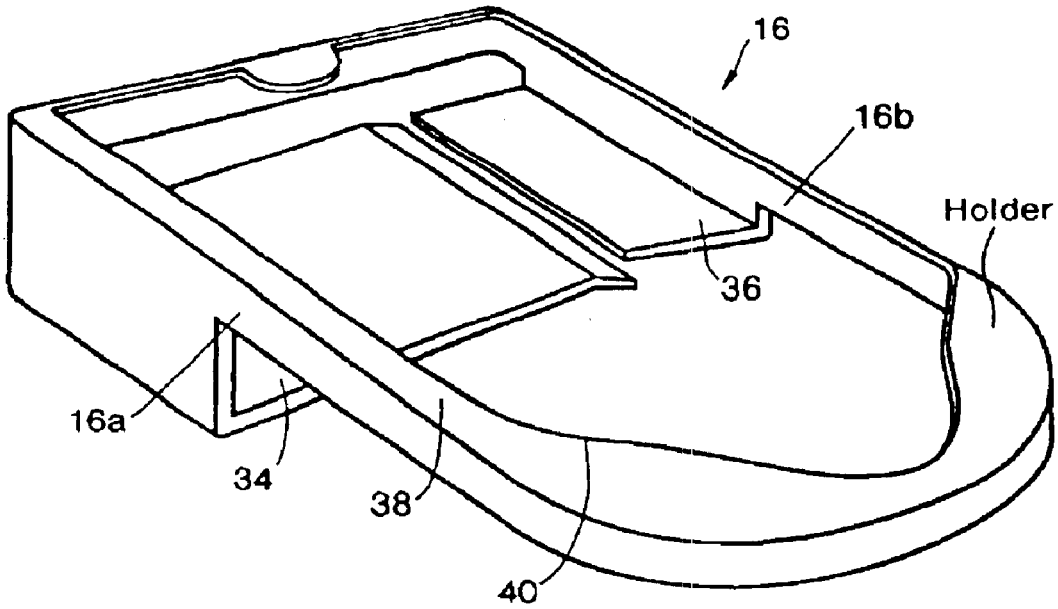
FIG. 4 is a perspective view of the sheath of FIG. 1.

Turning now to the figures, wherein like reference numerals refer to like elements, there is illustrated a transportable note pad holder 10. The note pad holder 10 includes a main body 12 that is adapted to carry a node pad 14. Preferably, the note pad 14 includes sheets of the removable, self-stick variety. The transportable note pad holder 10 further includes a sheath 16 that is adapted to removably carry the main body 12. The sheath 16 includes a means by which the sheath 16 is attachable to a back pack strap or the like. In this manner, the main body 12 can be inserted into the sheath 16 attached to a back pack for subsequent transportation by a user.

For carrying the note pad 14, the main body 12 includes a note pad holding well 18. The note pad holding well 18 is preferably rectangular in shape and sized to fully accommodate a standard 3M Corporation's "POST-IT" brand note pad of the 2 inch×3 inch×0.375 inch variety. It will be appreciated, however, that these dimensions are not meant to be limiting and that the note pad holding well 18 can be provided with other dimensions and shapes without departing from the spirit of the invention. To further facilitate the carrying of the note pad 14 within the main body 12, the bottom 18a of the note pad holding well 18 is preferably provided with a smooth surface to which the bottom self-sticking sheet of the note pad 14 may adhere. Alternatively, means can be provided on the side walls 18b/18c of the note pad holding well 18 for use in frictionally engaging the note pad 12.

To illuminate the interior of the note pad holding well 18 by which any messages written on the top sheet of the note pad 14 may be viewed, a light 20 is provided. Preferably, the light 20 is a light emitting diode (LED). The light 20 is powered by a battery 21 that is carried within the main body 12. If it is desired that the battery be replaceable, the main body 12 can be provided with a door 23 by which access to the battery may be gained. To activate the light 20, the light 20 can be connected to the battery by means of a timer activated switch. Alternatively, the light 20 can be connected to the battery by means of a user activatable switch connected to a push button 22 or the like.

To set the timer activated switch, a battery powered alarm clock 24 is provided. The clock 24 includes an alarm mode by which the user can set the time at which the light 20 is to illuminate. In this manner, at the designated time, the interior of the main body 12 would be illuminated by the light 20 to remind the user to view the note. It is contemplated that the light 20 would remain illuminated for a predetermined period of time after it is activated and/or turned off by the deactivation of the alarm, for example, by depressing the alarm button 24a. It is also contemplated that the main body could be provided with a speaker for use in sounding an audible alarm when the designated alarm time is reacted.

For protecting the note within the main body 12, the main body 12 preferably includes a lid 26 that is attached to the main body 12 by means of a hinge 27. The lid includes apertures 28 and 30 for accommodating the user activatable switch push button 22 and clock 24, respectively. For use in lifting the lid 26, the lid 26 may be provided with a raised lip at its end by which the user can force the lid 26 upward. To allow the user to view the note within the main body 14 while the lid 26 is closed, the lid 26 is provided with a transparent or translucent portion 26a that generally overlays that portion of the main body 12 in which the note pad holding well 18 is located. The transparent portion 26a can be integrally formed with the lid 26 or can be separately attached thereto. To better draw the attention of the user when the time to read the note is arrived, the lid portion 26a may be provided with a raised or domed shape as a means for increasing the visibility of the lid when effected by the illumination created by the light 20.

To transport he main body 12, the main body 12 may be removably inserted into the sheath 16. The sheath 16 includes a pair of resilient tension arms 34, 36 that are used to carry the sheath 16 on a back pack strap or the like. More specifically, the sheath 16 is attached to the back pack strap as the back pack strap is trapped between the resilient tension arms 34, 36 and the underside of the sheath 16. Once attached to the back pack strap, the main body 12 may be slid into the bottom opening formed in the sheath 16 to form the transportable note pad holder 10. The main body 12 may be maintained in place within the sheath 16 by being trapped between the strap, that is being forced inward under the influence of the resilient tension arms 34, 36 and lip 38 formed around a substantial portion of the circumference of the open top of the sheath 16. It will be appreciated that the resilient tension arms 34, 36 are preferably arranged so as to hold the main body 12 within the sheath without the requirement of a strap. Means for frictionally maintaining the main body 12 within the sheath 16 may also be provided, for example, by providing the sheath 16 with generally resilient sides 16a, 16b that are adapted to hold the main body 12 in pinched engagement therebetween.

When carried by the sheath 16, the lip 38 formed on the sheath 16 also functions to protect the hinge 27 and to maintain the lid 26 in closed engagement with the main body 12. For this latter purpose, the opening 40 defined by the lip 38 is sized to allow only a portion of the lid 26 to be visible therethrough. The size of the opening is, however, desired to be large enough to allow the user to view the transparent portion of the lid 26a, to view and gain access to the clock 24, and to gain access to the push button 22.

To enhance the esthetic nature of the transportable note holder 10, to make the note holder 10 more appealable to children, the various components that comprise the note holder 10 may be molded from colored plastics. Furthermore, to minimize the risk of injury of a child user, it is preferred that the note holder 10 be constructed so as to minimize sharp corners or edges. To this end, the bottom portion of the note holder 10 is preferably rounded. Additionally esthetic improvements to the note holder 10 can be achieved by, for example, placing decals upon the note holder 10 that depict logos from sports teams, cartoon caricatures or the like.

From the foregoing, it will be appreciated that an improved note pad holder has been discarded. In particular, the subject note pad holder is adapted for ease of transportation. Furthermore, the esthetically pleasing arrangement of the components and the use of an illuminated interior is believed to encourage use by children. In this manner, the note pad holder provides an enhanced means by which a parent can remind a child of a task, errand, etc.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

What is claimed is:

1. A transportable note pad holder, comprising:

a sheath having a resilient arm and an interior surface disposed opposite to the resilient arm; and a main body having a note pad well sized and arranged to contain a note pad, the main body being slidably and removably insertable into the sheath between the resilient arm and the interior surface;

wherein the resilient arm urges the main body into contact with the interior surface of the sheath when the main body is inserted into the sheath to maintain the main body within the sheath.

2. The transportable note pad holder as recited in claim 1, wherein the sheath comprises a lip formed around an opening in the sheath opposite the resilient arm and the main body is held in engagement between the resilient arm and the interior surface of the lip.

3. The transportable note pad holder as recited in claim 2, wherein the main body comprises a lid disposable over the note pad well and wherein the lid is visible through the opening when the main body is carried within the sheath.

4. The transportable note pad holder as recited in claim 3, wherein the main body comprises a hinge for attaching the lid to the main body and wherein the lid is adapted to protect the hinge when the main body is carried within the sheath.

5. The transportable note pad holder as recited in claim 3, wherein the lid has a portion through which the note pad well is visible.

6. The transportable note pad holder as recited in claim 5, wherein the main body further comprises a lamp for illuminating the note pad well.

7. The transportable note pad holder as recited in claim 6, wherein the main body further comprises an alarm clock for use in activating the lamp to thereby illuminate the note pad well at selected times.

8. The transportable note pad holder as recited in claim 1, wherein the resilient arm comprises a first arm portion inwardly extending from one side of the sheath and a second arm portion inwardly extending from an opposite side of the sheath and wherein the first arm portion and the second arm portion are adapted to cooperate with an underside surface of the sheath to trap a bag strap therebetween.

9. The transportable note pad holder as recited in claim 1, further comprising an alarm clock carried on the main body by which a reminder may be issued to view any notes within the note pad well.

10. The transportable note pad holder as recited in claim 9, further comprising a lamp associated with the alarm clock wherein the alarm clock is usable to illuminate the lamp at a selected alarm time.

11. The transportable note pad holder as recited in claim 1, wherein the note pad holding well is provided with a smooth surface to which a note pad of the self-sticking variety may adhere.

12. A transportable note pad holder, comprising:

a main body having a note pad well sized and arranged to contain a note pad;

a sheath in which the main body is releasably carried, the sheath having an underside surface, a resilient arm extending from the underside surface, and an upper surface;

wherein the resilient arm and the underside surface are adapted to trap a bag strap therebetween and the upper surface is adapted to cooperate with the trapped bag strap to engage the main body when the main body is carried within the sheath.

13. The transportable note pad holder as recited in claim 12, wherein the underside surface has a first side wall and a second side wall and the resilient arm comprises a first arm portion extending from the first side wall and a second arm portion extending from the second side wall, the first arm portion and the second arm portion extending in opposite directions from the respective side walls.

14. The transportable note pad holder as recited in claim 13, wherein the main body further comprises a lid, the lid having a transparent portion generally overlaying the note pad well through which the note pad well is visible.

15. The transportable note pad holder as recited in claim 14, wherein the upper surface of the sheath comprises a lip formed around an opening and wherein the opening is sized to allow the transparent portion of the lid to be visible when the main body is carried within the sheath.

16. The transportable note pad holder as recited in claim 15, wherein the lip is arranged to prevent the lid from opening when the main body is carried within the sheath.

17. The transportable note pad holder as recited in claim 13, wherein the main body further comprises an alarm for reminding a user to view the contents within the note pad well.

18. The transportable note pad holder as recited in claim 17, wherein the alarm further comprises a lamp for providing a visual indication to remind the user to view the contents with the note pad well.

19. The transportable note pad holder as recited in claim 18, wherein the lamp is arranged to illuminate the note pad well.

20. A transportable note pad holder, comprising:

a main body having a note pad well sized and arranged to contain a note pad and a hinged lid adapted to cover the note pad well, the lid having a portion through which the note pad well is visible;

a lamp carried by the main body for illuminating the note pad well; and a sheath in which the main body is releasably carried, the sheath having an upper surface having an opening through which the lid is visible and a resilient arm that is adapted to urge the main body into contact with the upper surface to thereby hold the main body in engagement between the resilient arm and the upper surface.

21. A transportable note pad holder comprising:

a main body having a note pad well sized and arranged to contain a note pad;

a lid connected by a hinge to the main body moveable between a first position wherein the lid covers the note pad well and a second position wherein the nozzle pad well is accessible; and a sheath in which the main body and lid are releasably carried wherein the sheath interferes with movement of the lid to prevent the lid from moving from the first position to the second position when the main body and lid are disposed within the sheath.

22. The transportable note pad holder as recited in claim 21, wherein the sheath has an opening through which the lid is visible and the lid has a portion through which the note pad well is visible.

23. The transportable note pad holder as recited in claim 21, wherein the sheath has a resilient arm that is adapted to carry the note pad holder on a bag strap.

24. The transportable note pad holder as recited in claim 23, wherein the resilient arm is further adapted to urge the main body into contact with an interior surface of the sheath thereby holding the main body in engagement between the resilient arm and the interior surface.

*25. A transportable note pad holder, comprising:*

*a main body having a note pad well sized and arranged to carry a note pad;*

*a lid hingedly attached to the main body having a portion through which the note pad well is visible, the lid being moveable between a first position wherein the lid covers the note pad well and a second position wherein the note pad well is accessible;*

*a lamp associated with an alarm clock mounted to the main body wherein the alarm clock is usable to illuminate the lamp at a selected alarm time; and*

*a resilient arm engaged to the transportable note pad holder to assist in attaching the transportable note pad holder to an external item.*

*26. The transportable note pad holder as recited in claim 25, further comprising a sheath having the resilient arm wherein the sheath is releasably attached to the main body.*

*27. The transportable note pad holder as recited in claim 25, wherein the lamp is carried adjacent to the note pad well.*

*28. The transportable note pad holder as recited in claim 25, wherein the lid and the main body are spaced opposite the hinged connection to allow access to the lid for moving the lid from the first position to the second position.*

* * * * *